Patented May 1, 1945

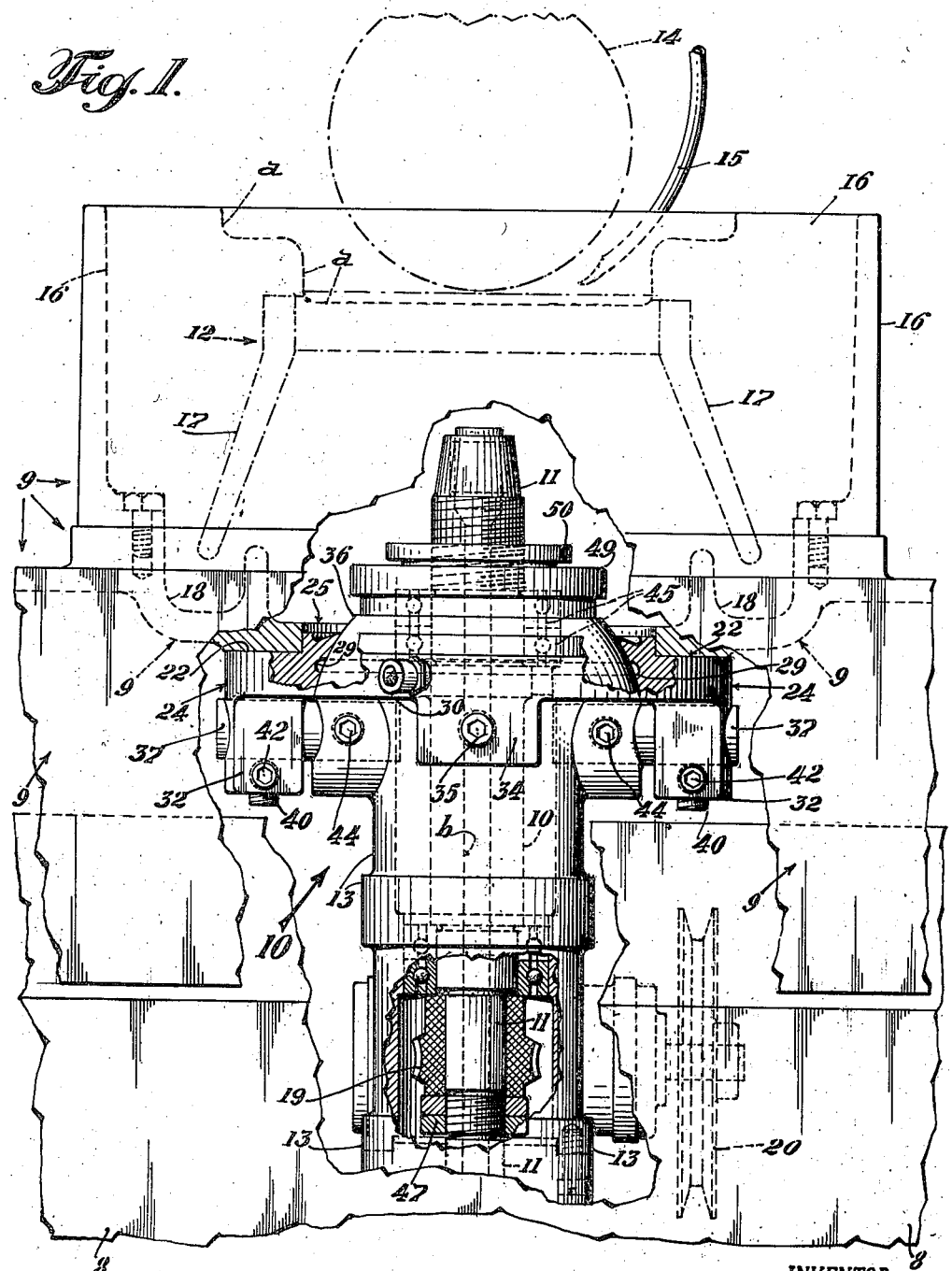

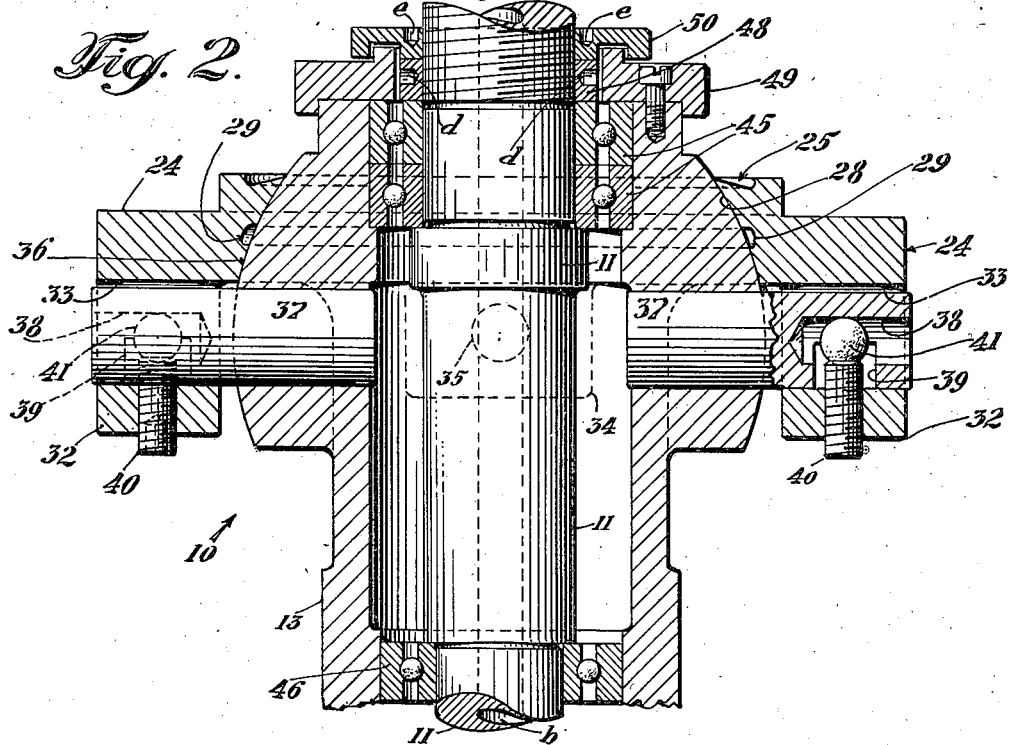
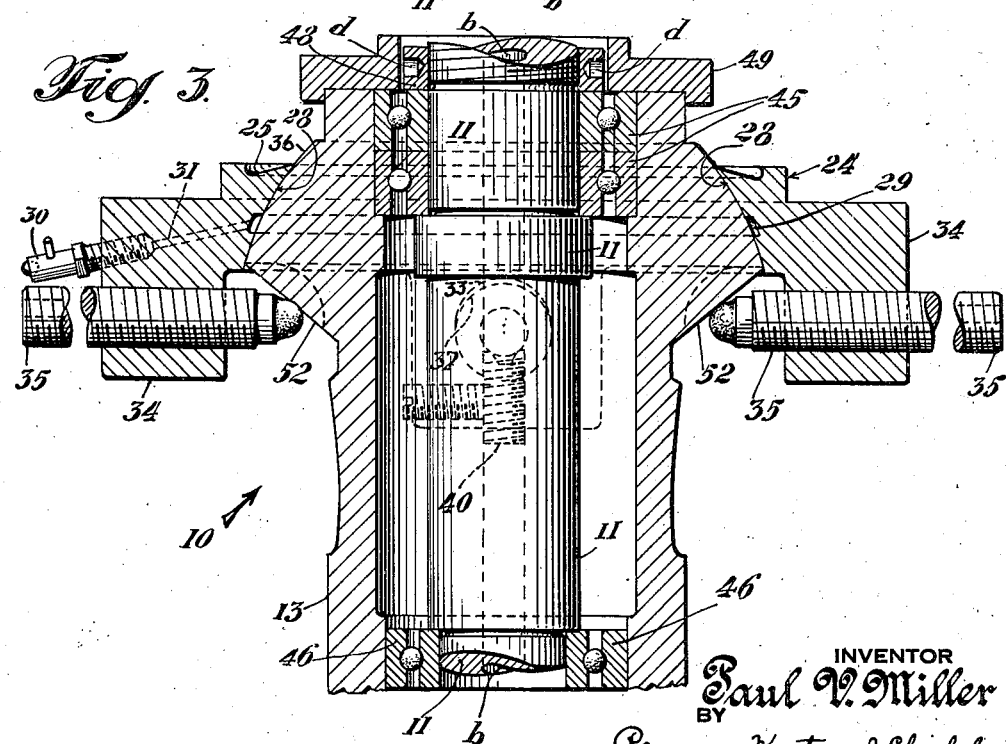

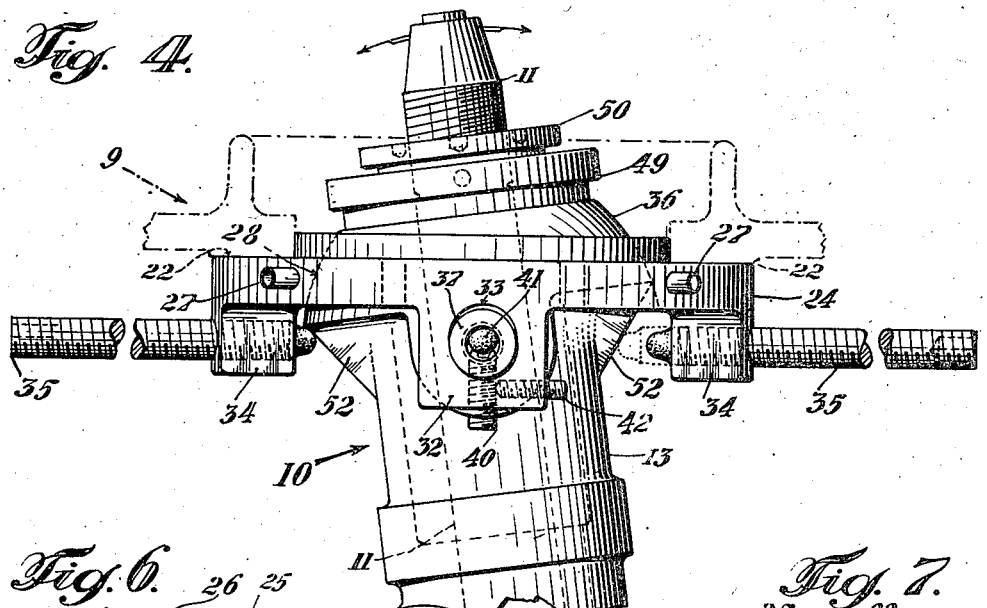
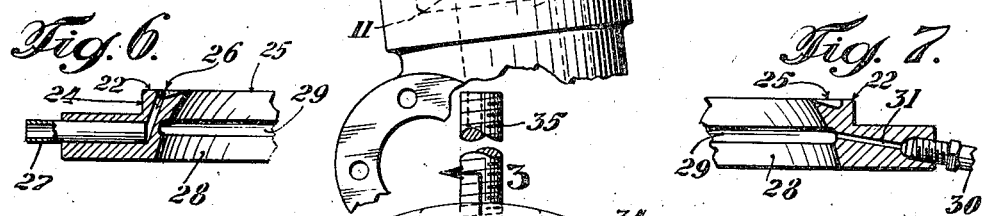
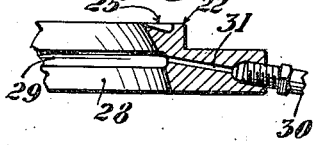
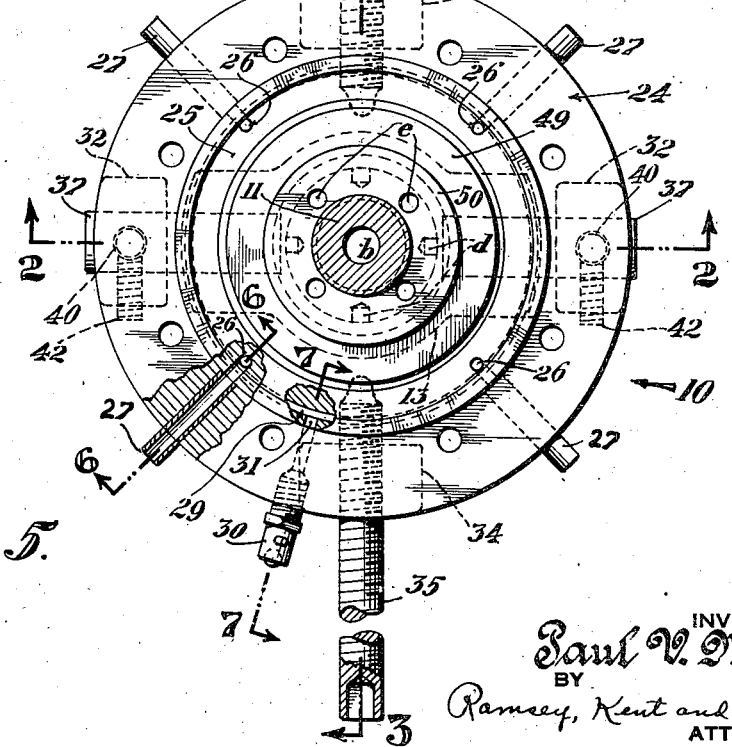

2,375,128

UNITED STATES PATENT OFFICE 2,375,128

SURFACE GRINDING MACHINE

Paul V. Miller, Woonsocket, R. I., assignor to The Taft-Peirce Manufacturing Company, Woonsocket, R. I., a corporation of Rhode Island Application April 22, 1943, Serial No. 483,980

7 Claims. (Cl. 51—237)

This invention relates to surface grinding machines of the type in which work pieces to be ground are held by a rotary chuck and are engaged by a rotary grinding disc. The rotary chuck is mounted on, and driven by, a spindle; and the invention particularly relates to grinders in which the spindle is tiltable to thereby cause conical surfaces to be ground on the work piece. Certain features of the invention are particularly applicable to such grinders used for wet grinding.

A general object of the invention is to provide a rotary surface grinder having an improved and "liquid tight" construction for tilting the work spindle of the grinder.

Another object of the invention is to provide a rotary surface grinder with a tilting work spindle construction which is provided with advantageous adjustment means to accurately align the spindle and to compensate for wear of parts.

A further object of the invention is to provide a simplified, rugged and reliable "liquid tight" construction for the tilting work spindle of a rotary surface grinder.

Various additional objects of the invention will be apparent to those skilled in the art from the following disclosure.

Fig. 1 of the drawings is a fragmentary front elevation of a rotary surface grinder embodying the present invention. The view has parts broken away to show the construction of the tilting work spindle.

Fig. 2 is a vertical section of the tilting work spindle construction, taken in general on the line 2—2 of Fig. 5. The view shows the spindle in vertical position.

Fig. 3 is a vertical section of the tilting work spindle construction, taken in general on the line 3—3 of Fig. 5. The spindle is in vertical position.

Fig. 4 is a side elevation of the work spindle housing and associated parts, the spindle being in tilted position.

Fig. 5 is a top plan view, partially in section, of the structure shown in Figs. 2 and 3.

Fig. 6 is a detail view taken on the line 6—6 of Fig. 5.

Fig. 7 is a detail view taken on the line 7—7 of Fig. 5.

Reference will first be had to Fig. 1. The machine has a stationary base structure 8 on which is mounted a reciprocatory table structure designated as a whole by 9. Attached to this table structure is the tilting work spindle assembly, designated as a whole by 10. The table structure 9 is adapted to be reciprocated under manual control toward and away from grinding disc 14, i. e., toward and away from a person viewing Fig. 1. The means for mounting the table structure 9 and for manually reciprocating it are not shown since they are well known and form no part of the present invention.

The work spindle assembly 10 includes a rotary work spindle 11 on the top of which is mounted, in conventional manner, a rotary magnetic chuck designated as a whole by 12. This chuck is adapted to support and hold a work piece to be ground; and the rotary grinding disc 14 effects the grinding. The grinding disc 14 is preferably mounted on a vertically extensible column (not shown). Also the grinding disc is preferably so mounted that the plane of the disc can be tilted forwardly and backwardly. Such mounting and tilting of the grinding disc form no part of the present invention, but are shown in my Patent 2,238,704 dated April 15, 1941.

For wet grinding, fluid is delivered adjacent to the grinding wheel through a pipe 15; and the fluid thrown from the chuck is caught by a tub-like structure 16 which surrounds the magnetic chuck 12. As viewed from the top, the tub structure 16 has at the front of the machine a curved wall which merges into flat side walls. The back wall of the tub is flat and is cut away as indicated by line a to provide clearance in connection with the grinding disc 14 and associated structure.

Preferably the magnetic chuck is provided with a flaring skirt 17 that aids in directing the grinding fluid to tub 16 and annular trough 18 into which the tub drains. From trough 18 the grinding fluid is drained through any suitable passages and pipes (not shown) and repumped to delivery pipe 15, as is well understood in the art. Some grinding fluid escapes over the inner wall of the trough 18 and reaches the zone adjacent to the work spindle assembly 10. Means which will be described later are used to drain off any such grinding fluid and return it to the reservoir (not shown) for repumping to delivery spout 15.

The work spindle 11 is journaled in a substantially vertical, but tiltable, housing 13, as will be described later. Spindle 11 is provided, at a lower point thereon, with a worm gear 19 driven by a worm (not shown). The drive for the worm, and hence for the spindle, is in the form of a pulley 20 adapted to be connected by a V-belt with an electric motor (not shown). The motor may be mounted on a depending extension 21 of housing 13. Thus when the housing 13 is tilted to tip spindle 11, pulley 20 and associated parts (including the electric motor) move as a unit with the housing. The spindle 11 is preferably hollow, as indicated at b, so that electric wiring can be extended longitudinally through the spindle to carry the operating current for magnetic chuck 12.

Reference will now be had to all of the figures of the drawing. Reciprocatory table structure 9 is provided with a downwardly facing annular seat 22, and fitting this seat and bolted thereto is an annular support designated as a whole by 24. This support is provided on its top surface with an annular gutter 25 from which grinding fluid is drained by passages 26 and pipes 27 (four shown), see particularly Figs. 5 and 6. From the drain pipes 27 the grinding fluid is returned in any suitable manner to a reservoir (not shown) for repumping to supply pipe 15 (Fig. 1), as is well understood in the art.

Annular support 24 has a downwardly facing spherically ground socket surface 28 provided with a grease groove 29 which extends entirely around this surface. A pressure gun fitting 30 is adapted to receive grease and transmit it under pressure through passages 31 to annular groove 29 (Figs. 3 and 5). Integral with and depending from support 24 are trunnion-receiving bosses 32, 32. At right angles to the axis of trunnion-receiving bosses 32, 32 the support 24 is provided with a pair of depending bosses 34, 34 in which are mounted adjustment screws 35, 35 that will be referred to later.

Housing 13 has a ball or spherical surface 36 which fits the socket 28. Projecting laterally from the housing are trunnion pins 37, 37 which project into bosses 32, 32 but which are of substantially smaller diameter than the holes 33, 33 in the bosses. Trunnions 37, 37 are axially bored at 38, 38 (Fig. 2) and have transverse clearance cut out at 39, 39. Threaded through the bottoms of bosses 32, 32 are set screws 40, 40 having concaved noses. In the noses rest balls 41, 41 which bear against the bores 38, 38 of the trunnions. By adjusting set screws 40, 40 work spindle 11 may be accurately aligned. Also the upward pressure of balls 41, 41 holds the ball-and-socket structure 28—36 in working engagement; and the set screws 40, 40 may be readjusted to compensate for wear. To prevent set screws 40, 40 from being loosened by vibration, they are engaged sidewise by additional set screws 42, 42. Trunnions 37, 37 may be separate pieces which accurately fit holes in housing 13 and which are locked to housing 13 by set screws 44, 44 (Fig. 1).

Spindle 11 is provided with pairs of preloaded precision ball bearings at 45 and 46. The construction is such that gear 19 and the pairs of bearings 45 and 46 may be assembled on spindle 11 and then the spindle be inserted downwardly into housing 13. Lower pair of bearings 46 and gear 19 are clamped on the spindle by a pair of lock nuts 47 (Fig. 1). Of course a spline (not shown) may be used with gear 19. Upper pair of bearings 45 is clamped on the spindle by a nut 48 (Fig. 2) which has holes d, d, for a spanner wrench. After the spindle is in place in housing 13, an annular cap 49 of the cross sectional form shown in Fig. 2 is bolted to the top of housing 13. Then a combination cap and lock nut 50 is screwed in place on spindle 11 and against nut 48. Nut 50 is manipulated by a suitable wrench which engages holes e, e.

It will be apparent that the labyrinth established by members 49 and 50 will effectively prevent grinding fluid from reaching the interior of housing 13. From members 49 and 50 grinding fluid drains to gutter 25 and is carried away as previously described. Grease which is forced under pressure to groove 29 and thence between the ball-and-socket surfaces 36 and 28, seals these parts against the entrance of grinding fluid.

The trunnion mounting at 37, 37 taken with the ball-and-socket structure 36—28, permits the spindle 11 to be aligned in a true vertical position, or to be tilted in a plane perpendicular to the plane of grinding wheel 14. Fig. 4 shows tilting toward the grinding wheel. This will result in the work piece being ground with a reentrant conical surface, since the grinding wheel, in effect, traverses a zone rearwardly of the center of the spindle. If spindle 11 be tilted forwardly, the work piece will be ground with a salient conical surface. In whatever position the spindle is placed, it is held in position by opposed adjustment screws 35, 35 which engage inclined abutments 52, 52 that are formed on housing 13.

In compliance with the patent statutes, I have disclosed the best form in which I have contemplated applying my invention. It will be understood, however, that the disclosure is illustrative, rather than limiting the scope of the invention.

What I claim is:

1. In a grinding machine having a grinding element, and a tiltable work spindle to rotate a work piece to be wet ground, the improvement which comprises: a horizontal annular support, the support having a downwardly facing socket surface provided with an annular grease groove, having an annular gutter in its upper surface with drainage from the gutter, and having a pair of depending spaced bosses provided with trunnion-receiving openings; a substantially vertical tiltable housing in which the work spindle is journaled and from the top of which the work spindle projects, the housing having near its upper end a ball surface in engagement with said socket surface; trunnions extending from opposite sides of the housing and loosely entering said trunnion-receiving openings, the trunnions being hollow and having transverse clearance slots therein; rolling bearing elements in the trunnions; adjustable means to urge the rolling bearing elements upwardly, whereby said ball surface of the housing is adjustably held in tiltable engagement with said socket surface of said support; a pressure lubricant fitting in communication with said annular grease groove, whereby the groove may be filled with grease under pressure to exclude grinding liquid from between the ball-and-socket surfaces; and means to substantially exclude liquid from entering the housing where the spindle projects upwardly from the housing.

2. In a grinding machine having a grinding element, and a tiltable work spindle to rotate a work piece to be ground, the improvement which comprises: a horizontal annular support, the support having a downwardly facing socket surface provided with an annular grease groove, and having a pair of depending spaced bosses provided with trunnion-receiving openings; a substantially vertical tiltable housing in which the work spindle is journaled and from the top of which the work spindle projects, the housing having near its upper end a ball surface in engagement with said socket surface; trunnions extending from opposite sides of the housing and loosely entering said trunnion-receiving openings, the trunnions being hollow and having transverse clearance slots therein; rolling bearing elements in the trunnions; adjustable means to urge the rolling bearing elements upwardly, whereby said ball surface of the housing is adjustably held in tiltable engagement with said socket surface of said support; and a pressure lubricant fitting in communication with said annular grease groove, whereby the groove may be filled with grease under pressure.

3. In a grinding machine having a grinding element, and a tiltable work spindle to rotate a work piece to be ground, the improvement which comprises: a horizontally positioned support having an opening therethrough and having a socket surface surrounding the opening; a housing in which the work spindle is journaled and from the top of which the work spindle projects, the work spindle extending upwardly through the opening in said support, said housing having a ball surface in tiltable engagement with said downwardly facing socket surface, means to urge said ball surface toward said socket surface; an annular grease groove incorporated in said ball and socket assembly; and means to conduct grease under pressure to the groove.

4. In a grinding machine having a grinding element, and a tiltable work spindle to rotate a work piece to be ground, the improvement which comprises: a horizontally positioned support having an opening therethrough and having a socket surface surrounding the opening; a housing in which the work spindle is journaled and from the top of which the work spindle projects, the work spindle extending upwardly through the opening in said support, said housing having a ball surface in tiltable engagement with said downwardly facing socket surface, means to urge said ball surface toward said socket surface; an annular grease groove incorporated in said ball and socket assembly; means to conduct grease under pressure to the groove; and means to substantially exclude liquid from entering the housing where the spindle projects upwardly from the housing.

5. In a grinding machine having a grinding element, and a tiltable work spindle to rotate a work piece to be ground, the improvement which comprises: a horizontally positioned support having an opening therethrough and having a downwardly facing bearing surface; a housing in which the work spindle is journaled and from the top of which the work spindle projects, the work spindle extending upwardly through the opening in said support, said spindle housing having an upwardly facing bearing surface in tiltable engagement with said downwardly facing bearing surface; means to urge said spindle housing upwardly whereby the urging means prevents downward movement of the spindle housing and the downwardly facing bearing surface prevents upward movement of the spindle housing; and means to secure said spindle housing in definite tilted position.

6. In a grinding machine having a grinding element, and a tiltable work spindle to rotate a work piece to be ground, the improvement which comprises: a horizontally positioned support having an opening therethrough and having a downwardly facing bearing surface; a housing in which the work spindle is journaled and from the top of which the work spindle projects, the work spindle extending upwardly through the opening in said support, said spindle housing having an upwardly facing bearing surface in tiltable engagement with said downwardly facing bearing surface; vertically adjustable means to urge said spindle housing upwardly whereby the urging means prevents downward movement of the spindle housing and the downwardly facing bearing surface prevents upward movement of the spindle housing; and means to secure said spindle housing in any one of a plurality of different definite tilted positions.

7. In a grinding machine having a grinding element, and a tiltable work spindle to rotate a work piece to be ground, the improvement which comprises: a horizontally positioned support having an opening therethrough, and having a downwardly facing socket surface surrounding the opening; a housing in which the work spindle is journaled and from the top of which the work spindle projects, the work spindle extending upwardly through the opening in said support, said spindle housing having an upwardly facing ball surface in tiltable engagement with said downwardly facing socket surface; means to urge said spindle housing upwardly whereby the urging means prevents downward movement of the spindle housing and the downwardly facing socket surface prevents upward movement of the spindle housing; and means to secure said spindle housing in definite tilted position.

PAUL V. MILLER.